March 30, 1948.  F. M. ARAVE ET AL  2,438,596
REFUSE CART
Filed Sept. 27, 1946

Inventors
FRANKLIN M. ARAVE AND
THOMAS W. NOLAN

Patented Mar. 30, 1948

2,438,596

UNITED STATES PATENT OFFICE 2,438,596

REFUSE CART

Franklin M. Arave and Thomas W. Nolan, Lava Hot Springs, Idaho; said Arave and said Nolan assignors of one-third to A. A. Foote, Lava Hot Springs, Idaho, and said Nolan assignor of one-third to Marian J. Bell, Lava Hot Springs, Idaho Application September 27, 1946, Serial No. 699,716

3 Claims. (Cl. 280—8)

Our invention relates to a refuse cart.

An important object of our invention is to provide a refuse cart, particularly adapted for use in hotels, apartments, schools, and other large buildings, for collecting trash, dust and dirt from the floors, and other refuse.

A further object is to provide a portable refuse cart for use in buildings of more than one story, and having means to facilitate the moving of the cart up and down the stairways of such buildings.

A still further object of the invention is to provide a portable refuse container which is light, durable, and inexpensive to manufacture.

Other objects and advantages of our invention will be apparent during the course of the following description.

Figure 1:
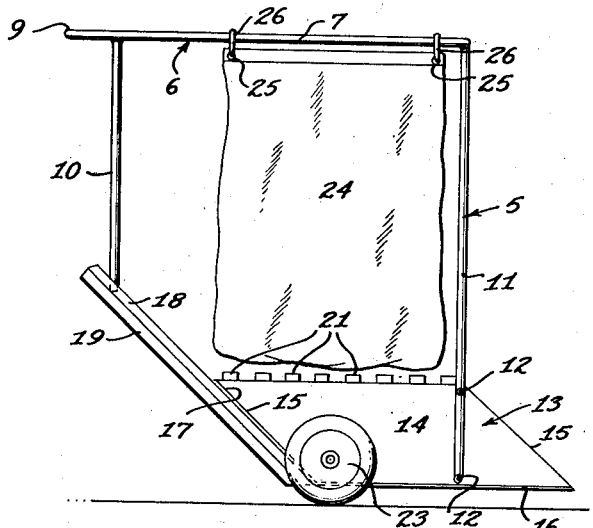
Figure 2:
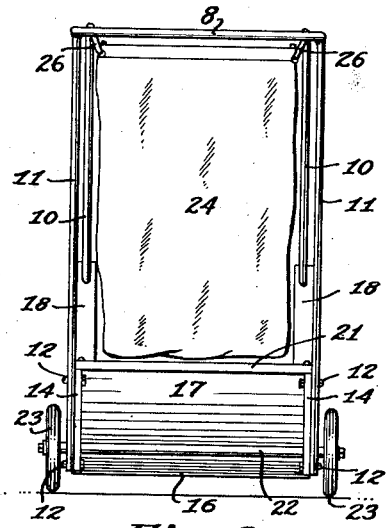
Figure 3:
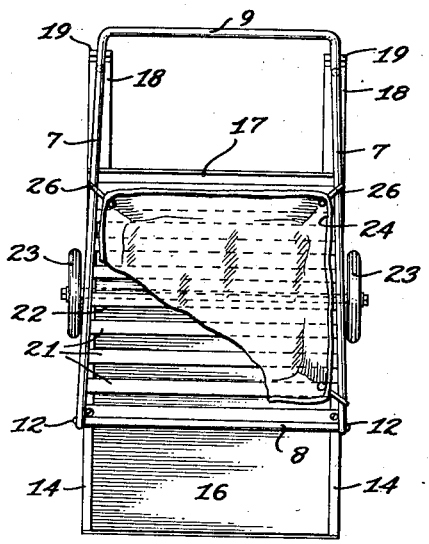
Figure 4:
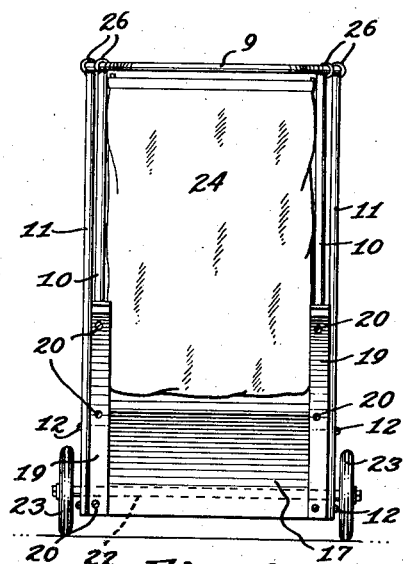

In the accompanying drawings, forming a part of this application, and in which like numerals are employed to designate like parts throughout the same, Figure 1 is a side elevation of the refuse cart embodying our invention, Figure 2 is a front end elevation of the same, Figure 3 is a plan view of the cart, parts broken away, and, Figure 4 is a rear elevation of the cart.

In the drawings, where for the purpose of illustration, is shown a preferred embodiment of our invention, the numeral 5 designates a frame, preferably of welded construction, and comprising preferably tubular metal members. This frame 5 includes an upper horizontal substantially rectangular loop 6, including substantially parallel sides 7, a front end 8, and a rear end or handle 9. The frame 5 further includes rear vertical bars 10, and front vertical bars 11, which bars are preferably welded to the horizontal loop 6, near or at its corners. The bars 11 extend downwardly below the lower ends of the bars 10.

Arranged near the lower ends of the bars 11, and rigidly secured to the same, by means of bolts 12, or the like, is a scoop or dust pan 13, which is generally U-shaped in transverse vertical cross section, and which is open at its forward end. The dust pan 13 includes parallel vertical sides 14, preferably formed of wood, which have suitable vertically spaced openings for receiving the bolts 12. The sides 14 have rearwardly inclined and preferably parallel front and rear edges 15. Suitably rigidly secured to the lower horizontal longitudinal edges of the sides 14, and extending for the full length of such lower edges, is a sheet metal bottom 16, the rear end of which has an extension 17, secured to the rear inclined edges 15, and forms the rear end of the dust pan.

The numeral 18 designates a pair of inclined strips, which are permanently rigidly secured to the rear end 17 and sides 14. These strips extend from the bottom edges of the sides 14 to the lower ends of the rear bars 10, with which they are permanently rigidly connected. The numeral 19 designates runners, preferably formed of hard wood, which are applied to the lower faces of the strips 18, and are detachably clamped thereto by screws 20, or the like, having their heads countersunk. Mounted upon the upper horizontal edges of the sides 14, are spaced slats 21, rigidly secured thereto by any suitable means, and adapted to form a tray or platform, for supporting empty bottles or the like.

The numeral 22 designates a horizontal transverse axle, extending through the sides 14, and secured thereto. This axle carries wheels 23, rotatable thereon, and preferably equipped with pneumatic tires.

Arranged within the frame 5, is a bag 24, preferably formed of heavy canvas, and equipped at its upper open end with suitable grommets 25, having hooks 26 secured therein, and these hooks detachably engage the loop sides 7.

In use, the cart may be rolled to the selected position in a room, and the forward end of the dust pan 13 lowered into engagement with the floor or carpet, whereby dust, or the like, may be easily swept into the dust pan. The bag 24 receives paper, or other trash. When the bag is heavily loaded its bottom will rest upon the slats 21, and be supported thereby. These slats may also be used to support empty bottles, or the like, arranged exteriorly of the bag. When the cart is to be moved up a stairway, it is rolled rearwardly, and the runners 19 are brought into engagement with the edges of the steps, whereby the cart may be conveniently slid up or down such stairway. The strips 18, by virtue of their connection with the bars 10, stiffen and reinforce the frame 5, providing a rigid structure. The wooden sides 14 also render the car more rigid, and reduce any tendency toward noise.

It is to be understood that the form of our invention herewith shown and described, is to be taken as a preferred example of the same, and that various changes in the shape, size and arrangement of parts may be resorted to, without departing from the spirit of our invention, or the scope of the subjoined claims.

Having thus described our invention, what we claim is:

1. A refuse cart, comprising a dust pan, wheels mounted upon the dust pan, inclined runners secured to the rear end of the dust pan and projecting above the same, a generally horizontal loop arranged above the dust pan and runners, bars connected with the loop near its forward end and connected with the dust pan near its forward end, and bars connected with the loop near its rear end and connected with the runners near their upper ends.

2. A refuse cart, comprising a dust pan, wheels mounted upon the dust pan, inclined runners secured to the rear end of the dust pan and projecting above the same, a generally horizontal loop arranged above the dust pan and runners, bars connected with the loop near its forward end and connected with the dust pan near its forward end, bars connected with the loop near its rear end and connected with the runners near their upper ends, a bag arranged near the horizontal loop, and means for suspending the bag from such loop.

3. A refuse cart, comprising a dust pan, wheels mounted upon the dust pan, inclined runners secured to the rear end of the dust pan and projecting above the same, spaced slats secured to the top of the dust pan for forming a platform, a generally horizontal loop arranged above the dust pan and runners, bars connected with the loop near its forward end and connected with the dust pan near its forward end, bars connected with the loop near its rear end and connected with the runners near their upper ends, a bag arranged near the horizontal loop and having its lower end adjacent to the slats, and means for suspending the bag from the horizontal loop.

FRANKLIN M. ARAVE.
THOMAS W. NOLAN.

REFERENCES CITED

The following references are of record in the file of this patent:

UNITED STATES PATENTS

| Number | Name | Date |
|---|---|---|
| 554,840 | Schultz | Feb. 18, 1896 |
| 1,513,045 | Jordan et al. | Oct. 28, 1924 |